(12) United States Patent
Wu et al.

(10) Patent No.: US 12,696,853 B2
(45) Date of Patent: Aug. 4, 2026

(54) BREEDING METHOD FOR CULTIVATING COLD-RESISTANT AND HIGH-TEMPERATURE-RESISTANT ANANAS COMOSUS GERMPLASM

(71) Applicant: HAINAN BETTER ECO-LEISURE AGRICULTURE TECHANOLOGY CO., LTD, Sanya (CN)

(72) Inventors: Junbei Wu, Sanya (CN); Yun Liu, Sanya (CN)

(73) Assignee: HAINAN BETTER ECO-LEISURE AGRICULTURE TECHANOLOGY CO., LTD, Sanya (CN)

( * ) Notice: Subject to any disclaimer, the term of this patent is extended or adjusted under 35 U.S.C. 154(b) by 0 days.

(21) Appl. No.: 19/222,950

(22) Filed: Jul. 1, 2025

(65) Prior Publication Data

US 2025/0374872 A1    Dec. 11, 2025

Related U.S. Application Data

(63) Continuation of application No. PCT/CN2023/136002, filed on Dec. 3, 2023.

(30) Foreign Application Priority Data

May 25, 2023    (CN) .......................... 202310598817.2

(51) Int. Cl.
*A01G 22/05* (2018.01)

(52) U.S. Cl.
CPC .................................... *A01G 22/05* (2018.02)

(58) Field of Classification Search
CPC ...................................................... A01G 22/05

(Continued)

(56) References Cited

FOREIGN PATENT DOCUMENTS

| | | |
|---|---|---|
| CN | 105075786 A | 11/2015 |
| CN | 107624388 A | 1/2018 |

(Continued)

OTHER PUBLICATIONS

Zhang, Yafen et al., "In vitro selection and identification of a cold-tolerant variant in pineapple (*Ananas comosus*)", Jan. 20, 2022 , Horticulture, Environment, and Biotechnology (2022) 63:275-286 (Year: 2022).*

(Continued)

*Primary Examiner* — Kimberly S Berona
*Assistant Examiner* — Erica Michelle Huebner

(57) ABSTRACT

A breeding method for cultivating a cold-resistant and high-temperature-resistant *Ananas comosus* germplasm comprises the following technical key points: creating a controllable greenhouse environment which simulates a natural environment for production, performing low-temperature domestication culture in two stages of seedling planting stage and breeding stage in a growth period, and performing high-temperature domestication culture in multiple stages of seedling growth stage, flowering stage, fruit stage and breeding stage, and for each key stage according to a growth pattern of *Ananas comosus*, providing precise technical implementation key points on time point control and management measure digitalization, so as to facilitate accurate implementation of operations. The method is simple and convenient for large-scale breeding production, multiple rounds of seedlings can be harvested in one round of production, and the seedling production efficiency of the cold-resistant and high-temperature-resistant *Ananas comosus* germplasm is multiplied.

1 Claim, 2 Drawing Sheets

(58) Field of Classification Search
USPC .................................................... 47/58.1 FV
See application file for complete search history.

(56) References Cited

FOREIGN PATENT DOCUMENTS

| | | | | |
|---|---|---|---|---|
| CN | 107853098 A | | 3/2018 | |
| CN | 108782061 A | * | 11/2018 | ............. A01N 37/12 |
| CN | 109122108 A | * | 1/2019 | ............. A01G 22/05 |
| CN | 110249927 A | * | 9/2019 | ............... C05C 9/00 |
| CN | 112931198 A | * | 6/2021 | ............... C12N 5/04 |
| CN | 113875512 A | * | 1/2022 | ............. A01G 22/05 |
| CN | 113973659 A | * | 1/2022 | ............... A01G 7/06 |
| WO | 2017211006 A1 | | 12/2017 | |

OTHER PUBLICATIONS

Internation Search Report of PCT/CN2023/136002, Mailed Apr. 3, 2024.
Aragón C et al., "The physiology of ex vitro pineapple (*Ananas comosus* L. Merr. var MD-2) as CAM or C3 is regulated by the environmental conditions: proteomic and transcriptomic profiles", Plant Cell Rep, vol. 32, No. 11, pp. 1807-1818.

* cited by examiner

BREEDING METHOD FOR CULTIVATING COLD-RESISTANT AND HIGH-TEMPERATURE-RESISTANT ANANAS COMOSUS GERMPLASM

CROSS-REFERENCE TO RELATED APPLICATIONS

This application is a continuation of International Patent Application No. PCT/CN2023/136002 with a filing date of Dec. 3, 2023, designating the United States, now pending, and further claims priority to Chinese Patent Application No. 202310598817.2 with a filing date of May 25, 2023. The content of the aforementioned applications, including any intervening amendments thereto, are incorporated herein by reference.

TECHNICAL FIELD

The present invention relates to the technical field of agricultural plant breeding, and particularly to a breeding method for cultivating a cold-resistant and high-temperature-resistant *Ananas comosus* germplasm.

BACKGROUND OF THE PRESENT INVENTION

*Ananas comosus* (*Ananas comosus* (L.) Merr.), also known as a pineapple, is the first of the four tropical fruits, which is a high-end tropical fruit with strong and unique fragrance and moderate sweet and sour taste, thus being very popular among consumers and having a high economic value. The *Ananas comosus* is suitable to grow in a semi-humid and semi-arid area with an annual average temperature of 22-26° C., can grow in a range of 15-40° C., and grows slowly below 15° C. In general, a critical temperature for the growth and cold resistance of the *Ananas comosus* is 6° C., a lowest temperature for short-term tolerance is 6-8° C., and a highest temperature for short-term tolerance is about 39° C. Multiple trace elements such as Mg, B, Zn, Fe, Gu, Mo and Mn play an important role in improving the resistance of the *Ananas comosus* to low-temperature and high-temperature damages. The vast majority of agricultural areas in China are located in non-tropical climate areas. Under influences of natural climate conditions of low temperature in winter, high temperature in summer and large temperature difference between cold and heat, a suitable ecological area for planting the *Ananas comosus* is limited to a coastal tropical ecological area with a lowest temperature above 8° C. in winter. Therefore, a breeding method for cultivating a cold-resistant and high-temperature-resistant *Ananas comosus* germplasm is developed, so that a tolerance temperature for planting a new *Ananas comosus* germplasm is expanded to a low-temperature area with a lowest temperature of 4° C. in winter and a high-temperature area with a highest temperature above 38° C. in summer, which is of great significance for expanding a planting area, improving a stress resistance of the *Ananas comosus*, realizing large-scale breeding production, increasing a production of the *Ananas comosus*, improving the quality, and improving the competitiveness of tropical high-efficiency agricultural production in the international market.

SUMMARY OF THE PRESENT INVENTION

Technical Problem

The present invention aims to provide a breeding method for cultivating a cold-resistant and high-temperature-resistant *Ananas comosus* germplasm, which can expand a planting ecological area of *Ananas comosus* to a suitable ecological area with a lowest temperature above 4° C. in winter, and has inventive effects of expanding a planting area, improving a stress resistance of the *Ananas comosus*, realizing large-scale breeding production, increasing a production of the *Ananas comosus*, increasing economic benefits, and improving a productivity of tropical high-efficiency agricultural *Ananas comosus*.

Technical Solution

In order to achieve the inventive effects above, the present invention adopts the following technical solutions: a breeding method for cultivating a cold-resistant and high-temperature-resistant *Ananas comosus* germplasm comprises the following steps:

S1: creating a controllable greenhouse environment which simulates a natural environment, wherein an application condition that illumination is appropriately increased in rainy weather is satisfied; setting a height of a ridge on the ground to be 40 cm, applying 50 kg/mu balanced long-lasting compound fertilizer and 300 kg/mu organic farmyard manure at a N:P:K ratio of 17:17:17 on the ridge as a base fertilizer, adopting spray irrigation, and testing and adjusting a relative humidity of soil to be 40%; and selecting 20-30 cm *Ananas comosus* offset germplasm seedlings for field planting according to a conventional planting method, and planting the seedlings after covering a plastic film on a ridge surface;

S2: domestication culture in seedling growth stage: adjusting a temperature to be 28-30° C. until first fertilization after the field planting, and 30 days after the field planting, implementing first root irrigation and fertilization, wherein specific operations of the fertilization are as follows: the balanced water-soluble compound fertilizer at the N:P:K ratio of 17:17:17 is used for the root irrigation and fertilization, a 100-fold aqueous solution is prepared for root irrigation once every 30 days by 300 ml/plant, and the root irrigation and fertilization is implemented 3 times in total in the seedling stage; 7 days after the first root irrigation and fertilization, implementing first application of foliar fertilizer, wherein the foliar fertilizer comprises a trace-element water-soluble fertilizer containing Mg:B:Zn:Gu:Fe:Mo:Mn at a ratio of 13‰:5‰:5‰:3‰2‰0.05‰:5‰, a 800-fold solution is prepared, and the foliar fertilizer is applied every 30 days by spraying on a leaf surface; 15 days after the first foliar fertilization, implementing cold-resistant domestication culture, wherein specific operations of the cold-resistant domestication culture are as follows: a room temperature is adjusted and reduced by 6-8° C. every day, kept for 5 days after being reduced to 4-6° C., and then increased by 5-7° C. every day, the temperature is kept at 36-38° C. in daytime after being recovered and heated to 36° C., a minimum temperature is kept at 25-28° C. in nighttime, and the culture is continued for 90 days; and observing a soil moisture content during the period to implement spray irrigation in time;

S3: domestication culture in flowering stage: when it is observed that 25 leaves come out, preparing a 2000-fold aqueous solution of chlormequat chloride, and spraying the solution on front and back leaf surfaces to promote growth and culture; after 30 days, adjusting a temperature to be 22-25° C. to prepare for flower forcing, and taking a measure to implement the flower forcing during the period, and after 10 days, adjusting the temperature to be 30-33° C.; and on a $30^{th}$ day after the flower forcing, observing that an inflorescence differentiated from a plant heart is red, and applying a foliar fertilizer prepared by compounding the foliar fertilizer in the step S2 with a 2000-fold aqueous solution of brassinolide on the leaf surface once;

S4: domestication culture in fruit stage: on a $60^{th}$ day after the flower forcing, preparing an aqueous solution by compounding 2‰ potassium dihydrogen phosphate with the foliar fertilizer in the step S2, and spraying the solution on the leaf surface once; and adjusting a temperature to be 36-38° C. in daytime, and controlling a minimum temperature to be 25-28° C. in nighttime; and S5: domestication culture in breeding stage: on a $120^{th}$ day after the flower forcing, picking fruits, and after 7 days, spraying a 1500-fold solution of 3% gibberellic acid on the leaf surface once, and then performing fertilization according to the operations of fertilization in the step S2; 20 days after the first fertilization in the step, when it is found that 2-3 cm buds appear under leaf axil, implementing cold-resistant domestication culture according to the operations of cold-resistant domestication culture in the step S2, after a plurality of offsets are bred from each mother plant, obtaining cold-resistant and high-temperature-resistant germplasm seedlings, and when the seedlings grow to 20-30 cm, harvesting and transplanting the seedlings; and after a first round of seedling harvesting, repeating the step S2 for multiple rounds, and harvesting the seedlings for multiple rounds, so as to multiply a production of the seedlings.

Beneficial Effects

The present invention expands an ecological area suitable for planting the *Ananas comosus* from an area with a traditional lowest temperature of 8° C. in winter to an area with a lowest temperature above 4° C. in winter, and has inventive effects of expanding a planting area, improving a stress resistance of the *Ananas comosus*, realizing large-scale breeding production, increasing a production of the *Ananas comosus*, increasing economic benefits, and improving a productivity of tropical high-efficiency agricultural *Ananas comosus*; and is beneficial for the industrialized and large-scale production for cultivating the cold-resistant and high-temperature-resistant *Ananas comosus* germplasm, and realizes effects of harvesting multiple rounds of seedlings in one round of production and multiplying the production at the same time.

DESCRIPTION OF THE DRAWINGS

In FIG. 1, the left side shows a cold damage resistance performance of a common germplasm plant in the growth stage, and the right side shows a cold damage resistance performance of a cold-resistant and high-temperature-resistant domesticated germplasm plant, namely a normal plant of *Ananas comosus* in growth stage.

In FIG. 2, the left side shows a heat-damaged fruit of the common germplasm plant, and the right side shows a normal fruit of the cold-resistant and high-temperature-resistant domesticated germplasm plant.

DETAILED DESCRIPTION OF PREFERRED EMBODIMENTS

Figure 1:
FIG. 1 shows a comparison of cold resistance performances of an *Ananas comosus* germplasm seedling cultivated by the method of the present invention and a common germplasm seedling in a growth stage.
Figure 2:
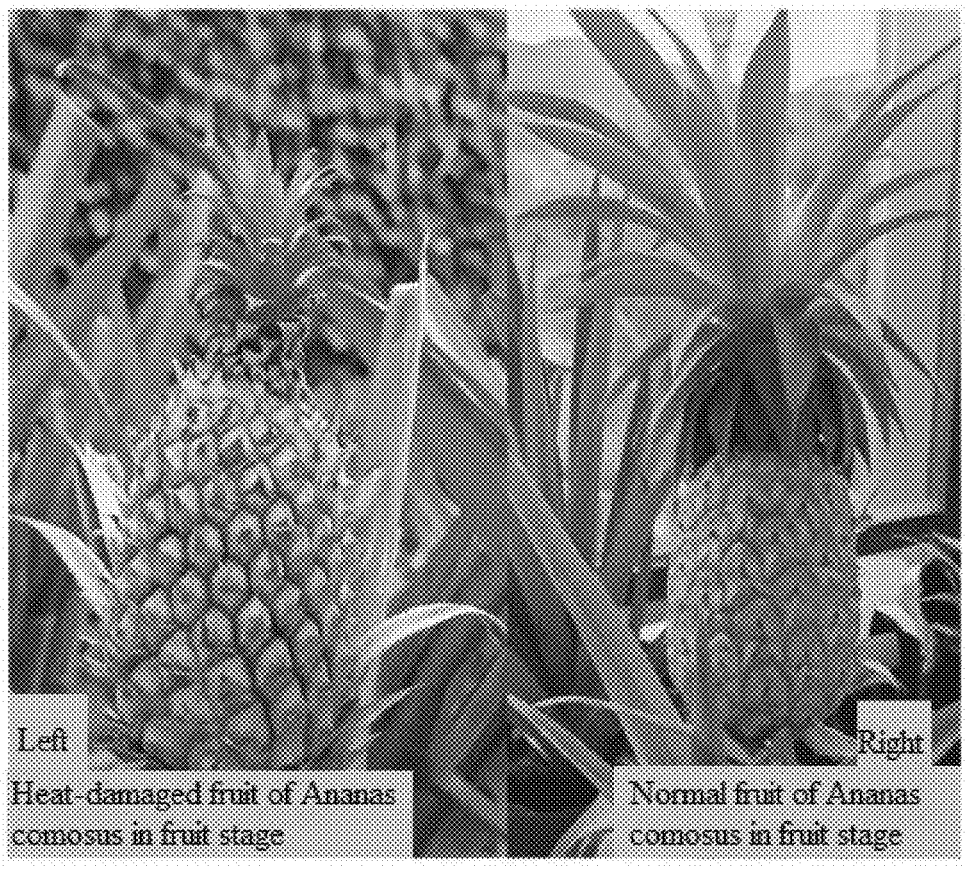
FIG. 2 shows comparison of high-temperature resistance performances of the *Ananas comosus* germplasm seedling cultivated by the method of the present invention and the common germplasm seedling in a fruit stage.

A breeding method for cultivating a cold-resistant and high-temperature-resistant *Ananas comosus* germplasm comprises the following steps:

S1: creating a controllable greenhouse environment which simulates a natural environment, wherein an application condition that illumination is appropriately increased in rainy weather is satisfied; setting a height of a ridge on the ground to be 40 cm, applying 50 kg/mu balanced long-lasting compound fertilizer and 300 kg/mu organic farmyard manure at a N:P:K ratio of 17:17:17 on the ridge as a base fertilizer, adopting spray irrigation, and testing and adjusting a relative humidity of soil to be 40%; and selecting 20-30 cm *Ananas comosus* offset germplasm seedlings for field planting according to a conventional planting method, and planting the seedlings after covering a plastic film on a ridge surface;

S2: domestication culture in seedling growth stage: adjusting a temperature to be 28-30° C. until first fertilization after the field planting, and 30 days after the field planting, implementing first root irrigation and fertilization, wherein specific operations of the fertilization are as follows: the balanced water-soluble compound fertilizer at the N:P:K ratio of 17:17:17 is used for the root irrigation and fertilization, a 100-fold aqueous solution is prepared for root irrigation once every 30 days by 300 ml/plant, and the root irrigation and fertilization is implemented 3 times in total in the seedling stage; 7 days after the first root irrigation and fertilization, implementing first application of foliar fertilizer, wherein the foliar fertilizer comprises a trace-element water-soluble fertilizer containing Mg:B:Zn: Gu:Fe:Mo:Mn at a ratio of 13‰:5‰:5‰:3‰:2‰: 0.05‰:5‰, a 800-fold solution is prepared, and the foliar fertilizer is applied every 30 days by spraying on a leaf surface; 15 days after the first foliar fertilization, implementing cold-resistant domestication culture, wherein specific operations of the cold-resistant domestication culture are as follows: a room temperature is adjusted and reduced by 6-8° C. every day, kept for 5 days after being reduced to 4-6° C., and then increased by 5-7° C. every day, the temperature is kept at 36-38° C. in daytime after being recovered and heated to 36° C., a minimum temperature is kept at 25-28° C. in nighttime, and the culture is continued for 90 days; and observing a soil moisture content during the period to implement spray irrigation in time;

S3: domestication culture in flowering stage: when it is observed that 25 leaves come out, preparing a 2000-fold aqueous solution of chlormequat chloride, and spraying the solution on front and back leaf surfaces to promote growth and culture; after 30 days, adjusting a temperature to be 22-25° C. to prepare for flower forcing, and taking a measure to implement the flower forcing during the period, and after 10 days, adjusting the temperature to be 30-33° C.; and on a $30^{th}$ day after the flower forcing, observing that an inflorescence differentiated from a plant heart is red, and applying a foliar fertilizer prepared by compounding the foliar fertilizer in the step S2 with a 2000-fold aqueous solution of brassinolide on the leaf surface once;

S4: domestication culture in fruit stage: on a $60^{th}$ day after the flower forcing, preparing an aqueous solution by compounding 2‰ potassium dihydrogen phosphate with the foliar fertilizer in the step S2, and spraying the solution on the leaf surface once; and adjusting a temperature to be 36-38° C. in daytime, and controlling a minimum temperature to be 25-28° C. in nighttime; and S5: domestication culture in breeding stage: on a $120^{th}$ day after the flower forcing, picking fruits, and after 7 days, spraying a 1500-fold solution of 3% gibberellic acid on the leaf surface once, and then performing fertilization according to the operations of fertilization in the step S2; 20 days after the first fertilization in the step, when it is found that 2-3 cm buds appear under leaf axil, implementing cold-resistant domestication culture according to the operations of cold-resistant domestication culture in the step S2, after a plurality of offsets are bred from each mother plant, obtaining cold-resistant and high-temperature-resistant germplasm seedlings, and when the seedlings grow to 20-30 cm, harvesting and transplanting the seedlings; and after a first round of seedling harvesting, repeating the step S2 for multiple rounds, and harvesting the seedlings for multiple rounds, so as to multiply a production of the seedlings.

EMBODIMENTS OF THE PRESENT INVENTION

The present invention is further described hereinafter with reference to specific embodiments, but the scope of the present invention is not limited to examples, and the scope of protection claimed is recorded in the claims.

Embodiment

Specific implementation of a breeding method for cultivating a cold-resistant and high-temperature-resistant *Ananas comosus* germplasm in this embodiment comprises the following steps:

S1: creating a controllable greenhouse environment which simulates a natural environment, wherein an application condition that illumination is appropriately increased in rainy weather is satisfied; setting a height of a ridge on the ground to be 40 cm, applying 50 kg/mu balanced long-lasting compound fertilizer and 300 kg/mu organic farmyard manure at a N:P:K ratio of 17:17:17 on the ridge as a base fertilizer, adopting spray irrigation, and testing and adjusting a relative humidity of soil to be 40%; and selecting 20-30 cm *Ananas comosus* offset germplasm seedlings for field planting according to a conventional planting method, and planting the seedlings after covering a plastic film on a ridge surface;

S2: domestication culture in seedling growth stage: adjusting a temperature to be 28-30° C. until first fertilization after the field planting, and 30 days after the field planting, implementing first root irrigation and fertilization, wherein specific operations of the fertilization are as follows: the balanced water-soluble compound fertilizer at the N:P:K ratio of 17:17:17 is used for the root irrigation and fertilization, a 100-fold aqueous solution is prepared for root irrigation once every 30 days by 300 ml/plant, and the root irrigation and fertilization is implemented 3 times in total in the seedling stage; 7 days after the first root irrigation and fertilization, implementing first application of foliar fertilizer, wherein the foliar fertilizer comprises a trace-element water-soluble fertilizer containing Mg:B:Zn:Gu:Fe:Mo:Mn at a ratio of 13‰:5‰:5‰:3‰:2‰:0.05‰:5‰, a 800-fold solution is prepared, and the foliar fertilizer is applied every 30 days by spraying on a leaf surface; 15 days after the first foliar fertilization, implementing cold-resistant domestication culture, wherein specific operations of the cold-resistant domestication culture are as follows: a room temperature is adjusted and reduced by 6-8° C. every day, kept for 5 days after being reduced to 4-6° C., and then increased by 5-7° C. every day, the temperature is kept at 36-38° C. in daytime after being recovered and heated to 36° C., a minimum temperature is kept at 25-28° C. in nighttime, and the culture is continued for 90 days; and observing a soil moisture content during the period to implement spray irrigation in time;

S3: domestication culture in flowering stage: when it is observed that 25 leaves come out, preparing a 2000-fold aqueous solution of chlormequat chloride, and spraying the solution on front and back leaf surfaces to promote growth and culture; after 30 days, adjusting a temperature to be 22-25° C. to prepare for flower forcing, and taking a measure to implement the flower forcing during the period, and after 10 days, adjusting the temperature to be 30-33° C.; and on a $30^{th}$ day after the flower forcing, observing that an inflorescence differentiated from a plant heart is red, and applying a foliar fertilizer prepared by compounding the foliar fertilizer in the step S2 with a 2000-fold aqueous solution of brassinolide on the leaf surface once;

S4: domestication culture in fruit stage: on a $60^{th}$ day after the flower forcing, preparing an aqueous solution by compounding 2‰ potassium dihydrogen phosphate with the foliar fertilizer in the step S2, and spraying the solution on the leaf surface once; and adjusting a temperature to be 36-38° C. in daytime, and controlling a minimum temperature to be 25-28° C. in nighttime; and S5: domestication culture in breeding stage: on a $120^{th}$ day after the flower forcing, picking fruits, and after 7 days, spraying a 1500-fold solution of 3% gibberellic acid on the leaf surface once, and then performing fertilization according to the operations of fertilization in the step S2; 20 days after the first fertilization in the step, when it is found that 2-3 cm buds appear under leaf axil, implementing cold-resistant domestication culture according to the operations of cold-resistant domestication culture in the step S2, after a plurality of offsets are bred from each mother plant, obtaining cold-resistant and high-temperature-resistant germplasm seedlings, and when the seedlings grow to 20-30 cm, harvesting and transplanting the seedlings; and after a first round of seedling harvesting, repeating the step S2 for multiple rounds, and harvesting the seedlings for multiple rounds, so as to multiply a production of the seedlings.

INDUSTRIAL APPLICABILITY

The breeding method for cultivating the cold-resistant and high-temperature-resistant *Ananas comosus* germplasm in the present invention is beneficial for the industrialized and large-scale production for cultivating the cold-resistant and high-temperature-resistant *Ananas comosus* germplasm, and realizes effects of harvesting multiple rounds of seedlings in one round of production, multiplying the production, and reducing costs at the same time.

FREE CONTENTS OF SEQUENCE TABLE a first root irrigation and fertilization upon 30 days after the field planting, wherein the fertilization comprises: using a water-soluble compound fertilizer at the N:P:K ratio of 17:17:17 for the root irrigation and fertilization, preparing a 100-fold aqueous solution for root irrigation once every 30 days by 300 ml/plant, and performing the root irrigation and fertilization 3 times in total in a seedling stage; upon 7 days after the first root irrigation and fertilization, performing first application

TABLE 1

| | | Observed data of cold resistance of 1000 plants to the cold damage in the base in Lingshan County, Guangxi | | |
|---|---|---|---|---|
| Growth stage of plants | Observation date | Temperature | | Observation of status of plants |
| Growth and development stage | February, 2021 | Minimum temperature in the month: 6° C.-8° C. for 11 days in total, 4° C.-6° C. for 5 days in total | | Cold-damaged plants: 0; normal plants: 1000 |
| Growth and development stage | January, 2021 | Minimum temperature in the month: 6° C.-8° C. for 8 days in total, 3° C.-6° C. for 10 days in total | | Plants with slightly cold-damaged leaves: 0; normal plants: 1000 |

Table 2 shows observed data of high-temperature resistance of the *Ananas comosus* germplasm seedlings to a heat damage obtained by the present invention.

TABLE 2

| | | Observed data of high-temperature resistance of 2000 plants to the heat damage in the base in Chengmai County, Hainan | |
|---|---|---|---|
| Growth stage of plants | Observation date | Temperature | Observation of status of plants |
| Growth and development stage | March, 2021 | Maximum temperature in the month: 38° C. for 1 day in total | Heat-damaged plants: 0; normal plants: 2000 |
| Growth and development stage | April, 2021 | Maximum temperature in the month: 38° C. for 1 day in total | Heat-damaged plants: 0; normal plants: 2000 |
| Growth and development stage | May, 2021 | Maximum temperature in the month: 38° C.-39° C. for 8 days in total | Heat-damaged plants: 0; normal plants: 2000 |
| Growth and development stage | June, 2021 | Maximum temperature in the month: 38° C.-40° C. for 6 days in total | Plants with slightly heat-damaged leaves: 1; normal plants: 1999 |
| Growth and development stage | July, 2021 | Maximum temperature in the month: 38° C. for 1 day in total | Heat-damaged plants: 1; normal plants: 1999 |
| Fruit development stage | April, 2022 | Maximum temperature in the month: 37° C. for 3 days in total | Heat-damaged plants: 0; normal plants: 2000 |
| Fruit development stage | June, 2022 | Maximum temperature in the month: 38° C. for 4 days in total | Heat-damaged plants: 0; normal plants: 2000 |

We claim:

1. A breeding method for cultivating a cold-resistant and high-temperature-resistant *Ananas comosus* germplasm, the breeding method comprising:

creating a controllable greenhouse environment simulating a natural environment, wherein an application condition that illumination is increased in rainy weather is satisfied;

setting a height of a ridge on the ground to be 40 cm, applying a 50 kg/mu compound fertilizer and a 300 kg/mu organic farmyard manure at a N:P:K ratio of 17:17:17 on the ridge as a base fertilizer, performing spray irrigation, and testing and adjusting a relative humidity of soil to be 40%; and selecting 20-30 cm *Ananas comosus* offset germplasm seedlings for field planting, and planting the seedlings after covering a plastic film on a ridge surface (S1);

adjusting a temperature to be 28-30° C. until a first fertilization after the field planting, and implementing of a foliar fertilizer, the foliar fertilizer comprising a trace-element water-soluble fertilizer containing Mg:B: Zn:Gu:Fe:Mo:Mn at a ratio of 13‰:5‰:5‰:3‰:2‰: 0.05‰:5‰, preparing a 800-fold solution, and applying the foliar fertilizer every 30 days by spraying on a leaf surface; upon 15 days after the first foliar fertilization, performing a cold-resistant domestication culture, wherein the cold-resistant domestication culture comprises: adjusting and reducing a room temperature by 6-8° C. every day, keeping the room temperature for 5 days after being reduced to 4-6° C., and then increasing the room temperature by 5-7° C. every day, and keeping the room temperature at 36-38° C. in daytime after being recovered and heated to 36° C., keeping a minimum temperature at 25-28° C. in nighttime, and continuing the cold-resistant domestication culture for 90 days; and observing a soil moisture content to implement spray irrigation during the period (S2);

preparing a 2000-fold aqueous solution of chlormequat chloride in response to observing that 25 leaves come out, and spraying the solution on front and back leaf surfaces to promote growth and culture; after 30 days, adjusting a temperature to be 22-25° C. to prepare for flower forcing, and performing the flower forcing during the period, and after 10 days, adjusting the temperature to be 30-33° C.; and on a 30th day after the flower forcing, observing a plant crown for emergence of a red inflorescence, and applying a foliar fertilizer prepared by compounding the foliar fertilizer in (S2) with a 2000-fold aqueous solution of brassinolide on a leaf surface once (S3);

preparing an aqueous solution by compounding 2‰ potassium dihydrogen phosphate with the foliar fertilizer in (S2) on a $60^{th}$ day after the flower forcing, and spraying the solution on the leaf surface once; and adjusting a temperature to be 36-38° C. in daytime, and controlling a minimum temperature to be 25-28° C. in nighttime (S4); and picking fruits on a 120th day after the flower forcing, and after 7 days spraying a 1500-fold solution of 3% gibberellic acid on the leaf surface once, and then performing fertilization according to the operations of fertilization in (S2); 20 days after a first fertilization in (S5), when observing that 2-3 cm buds appear under a leaf axil, performing cold-resistant domestication culture according to the operations of cold-resistant domestication culture in (S2), after a plurality of offsets are bred from each mother plant, obtaining cold-resistant and high-temperature-resistant germplasm seedlings, and when the seedlings grow to 20-30 cm, harvesting and transplanting the seedlings; and after a first round of seedling harvesting, repeating (S2) for a plurality of rounds, and harvesting the seedlings for a plurality of rounds, so as to multiply a production of the seedlings (S5).

\* \* \* \* \*